United States Patent [19]

Mallya et al.

[11] Patent Number: 5,656,705
[45] Date of Patent: Aug. 12, 1997

[54] SUSPENSION POLYMERIZATION

[75] Inventors: Prakash Mallya, Pasadena, Calif.; Colin C. Smith, State College, Pa.

[73] Assignee: Avery Dennison Corporation, Pasadena, Calif.

[21] Appl. No.: 333,208

[22] Filed: Nov. 2, 1994

[51] Int. Cl.$^6$ .................... C08F 2/00; C08F 220/10; C08F 220/06; C09J 4/02; C09J 133/08
[52] U.S. Cl. .................. 526/233; 526/328.5; 526/318.4
[58] Field of Search .................. 526/233, 318.4, 526/328.5

[56] References Cited

U.S. PATENT DOCUMENTS 2,687,408  8/1954  Grim .............................. 526/233
5,453,472  9/1995  Deckers et al. .................. 526/74

OTHER PUBLICATIONS

George Odian, Principles of Polymerization, 3rd ed, 1991, p. 302, John Wiley & Sons, Inc.

Primary Examiner—Jospeh L. Schofer
Assistant Examiner—Wu C. Cheng
Attorney, Agent, or Firm—Christie, Parker & Hale, LLP

[57] ABSTRACT

Inherently tacky infusible pressure-sensitive adhesive microspheres prepared by suspension polymerization of at least one water insoluble alkyl acrylate ester, the improvement which comprises conducting the polymerization in the presence of a buffer provided in an amount sufficient to maintain pH between 6 to 9.5 and in the presence of a surfactant to stabilize the product.

22 Claims, 1 Drawing Sheet

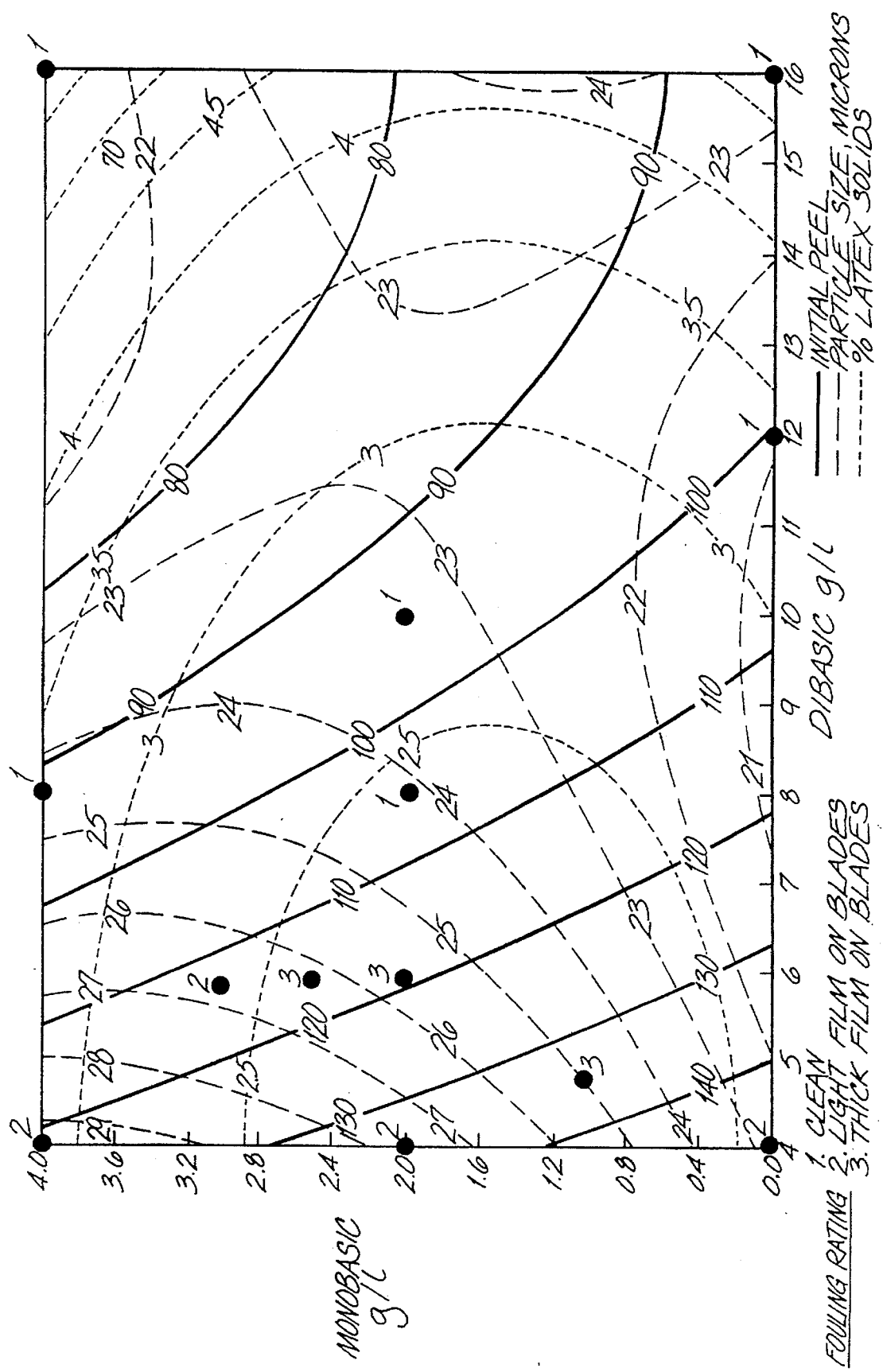

5,656,705

SUSPENSION POLYMERIZATION

BACKGROUND OF THE INVENTION

The present invention relates to the production of inherently tacky, elastomeric pressure-sensitive adhesive microspheres useful in the production of removable and repositionable note paper, tape and label products.

The mid-1970's saw the introduction of removable and repositionable note papers and tapes which have found broad acceptance in the marketplace. The adhesives utilized in some of the products were infusible, inherently tacky, elastomeric microspheres prepared by an aqueous suspension polymerization process.

U.S. Pat. No. 3,620,988 to Cohen, incorporated herein by reference, teaches the synthesis of suspension beads (microspheres) from acrylic monomers in the presence of a water insoluble suspension stabilizer such as crosslinked copolymer of acrylic acid. The monomer composition indicates that these beads would likely have been tacky microspheres.

U.S. Pat. No. 3,691,140 to Silver, incorporated herein by reference, teaches the synthesis of infusible, tacky microspheres of alkyl acrylates in the presence of an ionic comonomer which is substantially oil insoluble and in the presence of an anionic emulsifier provided at a level above its critical micelle concentration (CMC). A wide variety of ionic comonomers are disclosed such as imides, salts of acrylic acid and maleic anhydride.

U.S. Pat. No. 3,912,581 to Fink, incorporated herein by reference, teaches the synthesis of suspension polymers of acrylic monomers in the presence of water soluble stabilizers or water-insoluble suspending agents. Water soluble stabilizers disclosed are partially hydrolyzed polyvinyl acetate or sodium salt of a copolymer of methacrylic acid and one of its higher alkyl acrylate esters. Aluminum hydroxide is used as a water-insoluble suspending agent. An anionic emulsifier is also used to further improve suspension stability.

U.S. Pat. No. 4,166,152 to Baker, et al, incorporated herein by reference, describes a method for making inherently tacky microspheres based on acrylic monomers in the presence of an ionic suspension stabilizer and an anionic emulsifier.

U.S. Pat. Nos. 4,495,318 and 4,598,112 to Howard, each incorporated herein by reference, teach a method of forming the tacky microspheres wherein nonionic or cationic emulsifiers are used in combination with an ionic suspension stabilizer.

In both Baker et al. and Howard, when the suspension stabilizer is polyacrylic acid, it is neutralized to a pH of 7 with ammonia to Convert it to ammonium salt. No mention is made of the need to regulate the pH during polymerization to obtain reproducible and stable tacky microspheres.

U.S. Pat. No. 4,786,696 to Bohnel, incorporated herein by reference, teaches a process for making tacky microspheres without the use of ionic comonomers taught by Silver or ionic suspension stabilizers taught by Baker et al or Howard.

U.S. Pat. No. 4,833,179 to Young et al, incorporated herein by reference, teaches a process for making suspension polymer beads in the presence of suspending agents which are water-soluble inorganic salts such as tribasic calcium phosphate, barium sulfate, magnesium carbonate and the like, in addition a modifier moiety such as polystyrene macromer, reactive zinc salt or hydrophobic silica and the like. The presence of the modifier moiety with an adsorbed layer of inorganic suspending agent stabilizes the microspheres against coagulation when stored at high solids content.

The presence of surfactants and stabilizers have been observed to have a deleterious effect on the adhesive properties of the microspheres.

It is therefore desirable to make the microspheres in the absence of stabilizers and by use of low levels of surfactants.

The above identified patents do not recognize the significance of pH control in the suspension polymerization of alkyl acrylate monomers in order to obtain stable microsphere suspensions. This has been found to be especially true when the microspheres are made in the absence of suspension stabilizers as taught by Bohnel as attempts to duplicate the process of Bohnel has led to failure.

In addition, and as will be shown, the stability of the microspheres as made by the process of Silver varies considerably depending on acidity of the suspension, either before or at conclusion of polymerization.

SUMMARY OF THE INVENTION

It is now found that in the suspension polymerization of alkyl acrylate monomers, stable microspheres can be repeatedly produced independent of monomer composition, and independent of the use of suspension stabilizers, by use of a buffer to maintain the pH during and at the conclusion of the suspension polymerization process in the range of about 6.5 to about 9.5, preferably about 7 to about 8. By so doing, stable, inherently tacky, suspension microspheres will be formed with negligible fouling of reactor surfaces with coagulum, as represented by minimal coating of reactor surfaces and good storage stability without coagulation of the formed microspheres and an improvement in adhesive properties.

In the process the microspheres are further stabilized by an emulsifier, preferably an anionic emulsifier, present in the amount above its critical micelle concentration. No suspension stabilizers or water insoluble salts are required to impart suspension stability.

Useful buffers are those which do not interfere with the suspension polymerization process and include mono and diabasic phosphates of potassium, sodium, ammonium and the like, combinations of borax and sodium hydroxide and sodium acetate. What is required for the process is that the buffer be provided in a quantity sufficient to maintain pH within the desired range to combat the formation of acids believed to be produced by hydrolysis of the alkyl acrylate esters during the polymerization process at the elevated reaction temperatures, of about 80° C.

A presently preferred buffer is a dibasic phosphate preferably present in a concentration of at least about 8 grams per liter of water employed in the aqueous polymerization process. Monobasic buffers may be used in any amount with amounts of about 2 or more grams per liter presently preferred. The preferred monobasic phosphates are sodium dihydrogen phosphate, ammonium dihydrogen phosphate and mixtures thereof. The preferred dibasicphosphate are disodium hydrogen phosphate, diammonium hydrogen phosphate and mixtures thereof.

BRIEF DESCRIPTION OF THE DRAWINGS

FIG. 1 is a contour plot showing the effect of dibasic and monobasic phosphate buffer concentration on particle size in microns (dashed lines), peel strength (solid lines), and latex solids content (dotted lines).

DETAILED DESCRIPTION

According to the present invention, there is provided an improved method for the production of inherently tacky, infusible, elastomeric, pressure-sensitive adhesive microsphere polymers produced by suspension polymerization for use in the production of removable and repositionable products such as labels, note paper, tapes and the like.

The inherently tacky microspheres prepared according to the instant invention are made in the presence of a buffer provided in an amount sufficient to maintain pH of the reaction medium in the range of about 6 to about 9.5, more preferably in the range of about 7 to about 8.

Microspheres are further stabilized by an added emulsion emulsifier present in a concentration above its critical micelle concentration. The present preferred emulsifiers are anionic emulsifiers.

Any buffer that regulates pH within the desired range without interfering with the polymerization reaction can be employed. Useful buffers include, among others, the mono and dibasic phosphates of potassium, sodium, ammonium and the like, as well as mixtures thereof, combination of borax and sodium hydroxide and sodium acetate and the like. It is essential that a sufficient quantity of a buffer be used to control acid formation believed to be produced by hydrolysis of the alkyl acrylate ester monomers during polymerization. Lowering of pH below about 6 results in fouling of the reactor as well as severe coagulum formation. The same occurs at a pH above about 9.5.

The tacky microspheres are prepared in an aqueous medium in which at least the principal or bulk of the monomers are substantially insoluble, in the presence of a suitable surfactant and a buffering agent provided in a quantity sufficient to maintain pH during and at conclusion of reaction in the range of about 6 to about 9.5, preferably about 7 to about 8.

The preferred buffer is a dibasic phosphate present in a concentration of above about 7 grams per liter of water preferably above about 8 grams per liter of water. A monobasic phosphate may be optimally employed when used in a concentration of about 2 grams per liter of water. Weight ratio of dibasic phosphate to monobasic phosphate is preferably about 4 to 1 or more.

The principal monomers which can be homopolymerized or copolymerized are those which are insoluble in the aqueous medium and constitute the bulk of the monomers present for suspension polymerization. They include alkyl acrylate esters containing from 4 to about 10 carbon atoms in the alkyl group. As useful alklyl acrylate esters there may be mentioned isooctyl acrylate, 2-ethyl hexyl acrylate, butyl acrylate, sec-butyl acrylate, methyl butyl acrylate, 4-methyl 2-pentyl acrylate and the like. Comonomers which can be used include unsaturated mono and dicarboxylic acids such as methacrylic acid, acrylic acid, fumaric acid and the like, dibutyl fumarate, dioctyl maleate and the like. The other comonomers include methacrylates such as methyl methacrylate, isodecyl methacrylate and the like; styrene, vinyl acetate, vinyl pyrrolidone and the like. All that is required is that the principal monomers be substantially insoluble in the medium and be homopolymerizable or copolymerizable in suspension droplet form to form an infusible product which is an inherently tacky pressure-sensitive adhesive having a glass-transition temperature of less than about −20° C. Tackifiers and plasticizers known to be compatible with the monomers can be dissolved in the monomers followed by polymerization of the monomers or later added. In addition, macromonomers or polymers could also be dissolved in the monomers.

It is presently preferred to employ 2-ethyl hexyl acrylate as the monomer alone or with carboxylic acid. Carboxylic acid content is from 0 to about 5 percent by weight of the monomers. Acrylic acid is the preferred carboxylic acid. Polymerization preferably occurs in the presence of a monomer soluble initiator such as benzoyl peroxide, chloromethyl benzoyl peroxide, lauroyl peroxide, decanoyl peroxide and the like. The concentration of the initiator is from about 0.15 to about 0.5 percent by weight of the monomers preferably about 0.25 percent by weight of the monomers. Benzoyl peroxide is presently preferred. Autogenous reaction conditions are required for peroxide initiators.

While one may be present, a suspension stabilizer is not required to prevent coalescence of the polymer particles formed during polymerization.

A surfactant is required in addition to the buffer for optimum stability in a concentration which may or may not be above its critical micelle concentration. Typical concentration is above about 1 gram per liter of water preferably about 4 or more grams per liter most preferably above about 8 grams per liter of the water employed for suspension polymerization. Anionic surfactants are preferred but nonionic and cationic surfactants may also be used.

Typical anionic surfactants that can be used are sulfosuccinates and alkyl aryl polyether sulfonates. Sulfosuccinates include sodium dioctyl sulfosuccinate (Aerosol OT, manufactured by American Cyanamid) and sodium dihexyl sulfosuccinate (Aerosol MA, manufactured by American Cyanamid), sodium alkyl aryl polyether sulfonates (Triton X-200, manufactured by Rohm and Haas) and sodium alkyl benzene sulfonate such as sodium dodecyl benzene sulfonate (Rhodacal DS-10, manufactured by Rhone Poulenc). Nonionic surfactants that can be used are alkyl arylpolyether alcohols (Triton N-111, manufactured by Rohm & Haas) and the like, and if used are preferably used in combination with anionic surfactants.

Some degree of internal polymer cross-linking may be desired for cohesive strength and to achieve infusibility. One way to achieve this is by hydrogen abstraction using a peroxide-initiator. Another way is to employ a multifunctional additive such as multifunctional acrylate, triallyl cyanurate and the like during polymerization to allow cross-linking reactions to occur to control gel content. As the gel content is increased, the modulus of the polymer increases as well. A low modulus is desired to obtain quick wetting and bond formation to surfaces on which a product is applied. Hence, an optimum balance between gel content and modulus is necessary for good adhesive performance characteristics.

Shear, as induced by agitation, is used to effectively control particle size. It is presently preferred that sufficient shear be induced to provide a particle size smaller than about 200 microns, preferably smaller than about 90 microns. When the level of shear is too high, there is tendency for the formed particles to be so fine that on application to a substrate at moderate coat weights it will perform like a continuous film. Such a film would show low adhesion to rough surfaces which is not desirable. If shear is too low, particles of too great a size will be formed and tend to be too aggressive due to the high peel force per point of contact and increase the probability, for products removable from paper, of inducing fiber pick or paper tear. Preferably shear rates sufficient to provide particles smaller than about 200 microns should be used.

Salts such as sodium chloride and lithium chloride, and chelating agents which are soluble in the continuous aqueous phase, can be effectively used but at some sacrifice in conversion of the monomers to microspheres.

Gel content, as determined by extraction with tetrahydrofuran, can range from 60 to 80 percent by weight of the polymer preferably about 65 to about 75 percent. The tacky microspheres can be coated on a backing out of water to prepare useful products.

Typical solids content of microspheres in water can range from about 20 to about 45 percent by weight. Thickeners can be added to modify rheology to facilitate coating of backings directly from the aqueous suspension.

Alternatively, the particles can be recovered from the medium in which they are formed. Centrifugal separation may be employed to achieve this result. Gravity separation or low-energy centrifugation, if desired, can also be used to remove the bulk of the medium in which the microspheres are prepared and the microspheres incorporated into a more volatile organic medium.

The adhesive microspheres may be applied directly to paper and other backings. Priming may be used to improve anchorage to the paper and minimize transfer of microspheres to substrates. A particularly useful primer for acid containing microspheres is zinc oxide in an acrylic base polymer. This is coated on the paper and dried before coating the dispersion of microspheres. The particles will adhere better to such a primed surface due to the interaction between the acid groups present in the polymer and $Zn^{+2}$ present in the primer.

Products produced in accordance with the present invention generally comprise discontinuous coat of adhesive microspheres on at least a portion of at least one side of the carrier material and present in an amount to provide, in the zone bounded or defined by the adhesive, from about 10% to about 30%, preferably from about 15% to about 25%, of the adhesive present in the pattern, available for contact with a smooth substrate, such as stainless steel or glass, relative to the amount of adhesive which would have been present if the adhesive were applied as a continuous film. To achieve this level for effective contact, from about 30% to about 75% of the zone which would have been occupied by a continuous film, is covered by pressure-sensitive microspheres. The segments have an average height of at least from about 15 microns, preferably at least about 20 microns to account for the roughness of the face material and the surface to which the product is to be applied.

The following examples are illustrative, but no wise limiting of the instant invention.

EXAMPLES 1-52

To 470 grams of deionized water there was added 4 grams of disodium phosphate (anhydrous) and 1 gram of mono sodium phosphate (monohydrate) with mixing to dissolve the salts. The mixture was added to a reactor. The pH of the solution was 7.17. To 200 grams of 2-ethyl hexyl acrylate there was added 0.812 gram of a 75% benzoyl peroxide solution with mixing until the peroxide dissolved. The monomer with dissolved initiator was then added to the reactor and was subjected to three vacuum draws each lasting about 15 minutes. 4.05 grams of Rhodacal DS-10, an anionic surfactant sold by Rhone Poulenc was added to the reactor. The jacket of the reactor was brought to 61° C. and held at that temperature until reaction started. The reactor contents were held at about 82° C. for 4 hours then cooled. Final pH was 7.1, particle size was 32 u and the solids content was about 30%. The reactor was clean, the blades were clean and there was no measurable goagulum in the suspension of formed polymer beads.

A number of other reactions were run with ammonium dihydrogen phosphate instead of monosodium phosphate. Sodium chloride was added at low levels to impart stability to the suspension. Although the sodium chloride helped stabilize the suspension at low buffer levels, it leads to an increase in the percent latex solids, a non-useful product. This is shown in Table 1.

Ethylene diamine tetraacetic acid (EDTA) was added in some instances to impart multivalent electrolyte stability to the suspension. Its addition resulted in an increase in latex solids as shown in Tables 1 and 2. Tables 1 and 2 show reactions run at 30% solids. Forty percent solids reaction products are shown in Table 3.

pH after the addition of the surfactant before starting of heat up of the reaction mixture was noted as the "pH start" in the Tables and "pH end" was the final pH of the suspension. Particle size was measured using a Leeds and Northrop Microtrac particle size analyzer.

At lower buffer levels, the suspension stability and reactor fouling was less at lower reaction temperatures of about 62° C. See Example 4. At low buffer levels, increasing the surfactant level at higher reaction temperatures did not reduce fouling. At higher buffer levels, fouling was not an issue at the higher reaction temperature of 82° C. common to all other Examples.

On standing overnight, the suspension separated into two phases with the suspension beads forming the top phase and the latex being in the bottom phase. The percent solids of the bottom layer was measured and reported as the percent latex solids in the Tables.

The overall objective was to use a level of buffer that would maintain the pH in the range of about 6.5 to 8, provide a clean reactor and blades, give low latex solids and highest TLMI peel. TLMI peel was 90° peel at 300 inches per minute after a dwell time of 20 minutes. In addition to pH, the level of buffer also has an influence on the cleanliness of the reactor and the blades.

FIG. 1 is a contour plot of peel adhesion, particle size and latex solids as a function of the level of monobasic and dibasic sodium phosphates. Above a level of 7 g/l dibasic phosphate, the reactor and the blades were clean and below that level, there was thin film formation on the blades. The ideal region for optimum balance of high peel, low percent latex solids and high particle size with clean reactor and blades is in the region of 4:1 ratio of dibasic to monobasic phosphate and at a dibasic phosphate content of from about 7 to about 8 grams per liter of water. At higher dibasic content levels, peel adhesion drops and the percent latex solids, which does not contribute to peel, goes up. A study of surfactant levels as a function of buffer content at a 4:1 ratio of dibasic to monobasic buffer revealed that reactor and blades were clean at a surfactant level of about 1 g/liter of water or greater.

Comparative Study and (Controls 1 to 4)

As a comparison the procedure of Silver was followed in that 3.14 grams of acrylic acid was dissolved in 100 grams of deionized water. Solution pH was 2.3. There was added to the solution 52.3 grams of approx. 1N NaOH to form sodium acrylate in the amount of 2 parts per hundred parts monomers (pphm) solution. pH became 9.01. There was added to the solution 328.6 grams of deionized water and a mixture of 200 grams of 2-ethyl hexyl acrylate and 62 grams of 98% benzoyl peroxide solution. The pH became 7.3. About 0.5 gram of the 1N sodium hydroxide solution was added to bring the pH to 9.15. The solution was subjected to vacuum stripping for 15 minutes then transferred to a 1 liter jacketed reactor equipped with pitched turbine blades, reflux condenser and with inlets for N2 and for purge adding ingredients. To the reactor was added 4.05 grams of Rhodacal DS-10 emulsifier. A nitrogen blanket was maintained over the ingredients and the jacked heated to 63° C. After about one-half hour, an internal temperature of 64° C. was noticed to be slightly higher than the jacket temperature of 62° C. At this point, the jacket temperature was raised to 83° C. and the contents held for 5 hours at this temperature and discharged. Final pH of the suspension was 6.4. The suspension was stable and the reactor and the blades were clean. Analysis of the suspension indicated that essentially all of the sodium acrylate was unreacted.

When sodium acrylate level was decreased below 2 pphm, however, severe fouling of the reactor, blades and coagulum formation in the suspension was seen. See Controls 1, 2 and 3.

When acrylic acid (AA) was used instead of sodium acrylate, severe coagulum also occurred. See Control 4. The results are reported in Table 4.

By contrast when a buffer was employed clean polymerization occurred using 0.5 grams of acrylic acid.

TABLE 1

| Example | $Na_2HPO_4$ g | $NH_4H_2PO_4$ g | $NaH_2PO_4$ g | NaCl g | EDTA g | pH start | pH end | % latex solids | Comments |
|---|---|---|---|---|---|---|---|---|---|
| 1 | 2 | 1 | 0 | 0 | 0 | 7.23 | 7.15 | 4.05 | clean reactor and suspension |
| 2 | 1 | 0.5 | 0 | 0 | 0 | 6.97 | 6.92 | 5.34 | thick film on blades, clean suspension |
| 3 | 0.5 | 0.25 | 0 | 0 | 0 | 7 | 6.88 | 3.7 | coagulum |
| 4 | 0.5 | 0.25 | 0 | 0 | 0 | 7.07 | | | thin film on reactor, cookoff at 62° C. |
| 5 | 1 | 0.5 | 0 | 1.9 | 0 | 6.91 | 6.69 | 7.96 | clean reactor and suspension |
| 6 | 0.5 | 0.25 | 0 | 2.2 | 0 | 6.89 | 6.69 | 10.08 | clean reactor and suspension |
| 7 | 0.5 | 0.25 | 0 | 0.9 | 0 | 6.91 | 6.6 | 8.89 | thick film on blades, clean suspension |
| 8 | 2 | 1 | 0 | 0 | 0.34 | 6.63 | | | light film on blades |
| 9 | 4 | 2 | 0 | 0 | 0 | 6.67 | | | clean |
| 10 | 3 | 1.5 | 0 | 0 | 0 | 6.51 | | | light film on blades |
| 11 | 4 | 0 | 2 | 0 | 0 | 6.83 | 6.49 | | clean |
| 12 | 6 | 0 | 3 | 0 | 0 | 6.86 | 6.68 | | clean |
| 13 | 5 | 0 | 1 | 0 | 0 | 7.28 | 7.09 | | clean |
| 14 | 4 | 0 | 2 | 0 | 0 | 6.8 | 6.68 | | light film on blades, .5 g AA as comonomer |
| 15 | 3 | 0 | 1 | 0 | 0 | 7.23 | | | film on blades |
| 16 | 2.5 | 0 | 0.5 | 0 | 0 | 7.52 | | | film on blades |
| 17 | 3 | 0 | 1.5 | 0 | 0 | 7.11 | | | clean |
| 18 | 3 | 0 | 1.5 | 0 | 0 | 7.15 | | | light film on blades |
| 19 | 3 | 0 | 1.25 | 0 | 0 | 7.23 | | | thick film |
| 20 | 2.5 | 0 | 1.5 | 0 | 0 | 7.07 | | | film on blades |
| 21 | 4 | 0 | 1 | 0 | 0 | 7.33 | | | clean |
| 22 | 4 | 0 | 1 | 0 | 0 | 7.39 | | | clean |
| 23 | 4 | 0 | 1 | 0 | 0 | 7.44 | | | clean |

TABLE 2

| Example | $Na_2HPO_4$ g | $NH_4H_2PO_4$ g | $NaH_2PO_4$ g | EDTA ppm | pH start | pH end | Fouling | TLMI peel, n/M | Particle size, microns | % latex solids |
|---|---|---|---|---|---|---|---|---|---|---|
| 24 | 2 | 0 | 2 | 0 | 6.8 | 6.7 | 2 | 121 | 30 | 3.3 |
| 25 | 5 | 0 | 1 | 0 | 7.6 | 7.4 | 1 | 97 | 23 | 2.9 |
| 26 | 8 | 0 | 1 | 500 | 7.9 | 7.7 | 3 | 80 | 27 | 8.1 |
| 27 | 2 | 0 | 0 | 0 | 9.6 | 7.7 | 2 | 150 | 23 | 2.5 |
| 28 | 5 | 0 | 1 | 500 | 7.6 | 7.4 | 1 | 119 | 21 | 5.2 |
| 29 | 2 | 0 | 1 | 500 | 7.2 | 7.1 | 3 | | 26 | 4.4 |
| 30 | 5 | 0 | 1 | 500 | 7.6 | 7.6 | 1 | 58 | 23 | 6.0 |
| 31 | 5 | 0 | 1 | 500 | 7.6 | 7.6 | 1 | 80 | | 5.4 |
| 32 | 2 | 0 | 2 | 1000 | 6.9 | 6.8 | 2 | 66 | 28 | 6.5 |

TABLE 2-continued

| Example | Na$_2$HPO$_4$ g | NH$_4$H$_2$PO$_4$ g | NaH$_2$PO$_4$ g | EDTA ppm | pH start | pH end | Fouling | TLMI peel, n/M | Particle size, microns | % latex solids |
| --- | --- | --- | --- | --- | --- | --- | --- | --- | --- | --- |
| 33 | 5 | 0 | 2 | 500 | 7 | 6.9 | 1 | 81 | 21 | 6.0 |
| 34 | 2 | 0 | 0 | 1000 | 10.7 | 7.5 | 3 | | | 11.8 |
| 35 | 5 | 0 | 1 | 500 | 7.6 | 7.2 | 1 | 66 | 23 | 4.3 |
| 36 | 5 | 0 | | 1000 | 7.6 | 7.4 | 1 | 55 | 23 | 5.4 |
| 37 | 8 | 0 | | 1000 | 7.3 | 7.2 | 1 | 81 | 19 | 7.3 |
| 38 | 8 | 0 | 1 | 0 | 9.3 | 8 | 1 | 95 | 24 | 4.7 |
| 39 | 5 | 0 | | 500 | 9.9 | 7.9 | 3 | | | 11.8 |
| 40 | 8 | 0 | 0 | 1000 | 9.8 | 8 | 1 | 68 | 20 | 10.6 |
| 41 | 8 | 0 | 0 | 0 | 7.2 | 7.1 | 1 | 65 | 22 | 5.3 |

Fouling:
1 - clean reactor and blades
2 - slight film on blades
3 - thick film on blades

TABLE 3

| Example | DS-10 g | Buffer g | % Latex Solids | Part. Size M | TLM1 Peel, n/m |
| --- | --- | --- | --- | --- | --- |
| 42 | 3.46 | 2.14 | 4.73 | 29 | 99.18 |
| 43 | 1.73 | 4.28 | 2.44 | 27 | 98.46 |
| 44 | 5.4 | 6.42 | 7.91 | 18.9 | 91.12 |
| 45 | 3.46 | 4.28 | 4.62 | 23 | 48.84 |
| 46 | 5.4 | 4.28 | 7.9 | 20.5 | 87.66 |
| 47 | 3.46 | 4.28 | 3.17 | 25.3 | 85.1 |
| 48 | 1.73 | 6.42 | 4.81 | 25.59 | 86.78 |
| 49 | 3.46 | 6.42 | 3.74 | 21.89 | 87.84 |
| 50 | 3.46 | 4.28 | 3.26 | 33.78 | 92.5 |
| 51 | 5.4 | 2.14 | 6.15 | 23.98 | 86.1 |
| 52 | 3.46 | 4.28 | 3.98 | 25.36 | 88.7 |

TABLE 4

| Comparative/Control | Ingredient (g) | pH start | pH end | Comments |
| --- | --- | --- | --- | --- |
| Comparing | Sodium acrylate, 2 | 9.15 | 6.4 | clean reactor, blades, suspension |
| 1 | Sodium acrylate, 1 | 8.95 | 5.86 | severe fouling on blades, reactor |
| 2 | Sodium acrylate, 5 | 9.12 | 5.64 | suspension coagulated |
| 3 | Sodium acrylate, 2 | 9.75 | 5.3 | suspension coagulated |
| 4 | Acrylic acid, 2 | 2.3 | 2.3 | suspension coagulated |

What is claimed is:

1. In a process for the production of inherently tacky, infusible, pressure-sensitive adhesive microspheres by suspension polymerization of at least one alkyl acrylate ester containing from 4 to about 10 carbon atoms in the alkyl group in an agitated aqueous medium in a reactor, the improvement which comprises providing to the aqueous medium a buffer present in an amount sufficient to maintain pH of the aqueous media in the range of from about 6 to about 9.5 during suspension polymerization process and in the presence of a surfactant, said buffer and surfactant cooperating to prevent coagulation of formed microspheres and fouling of the reactor.

2. A process as claimed in claim 1 in which pH is maintained in the range of from about 7 to about 8.

3. A process as claimed in claim 1 in which the alkyl acrylate ester is 2-ethylhexyl acrylate.

4. A process as claimed in claim 1 in which the buffer is selected from the group consisting of dibasic phosphates, monobasic phosphates and mixtures thereof.

5. A process as claimed in claim 1 in which the buffer comprises a dibasic phosphate present in an amount of at least about 7 grams per liter of water forming the aqueous media.

6. A process as claimed in claim 1 in which the buffer is a mixture of at least one dibasic phosphate and at least one monobasic phosphate in which the weight ratio of dibasic phosphate to monobasic phosphate is at least about 4 to 1.

7. A process as claimed in claim 5 in which the buffer is a mixture of at least one dibasic phosphate and at least one monobasic phosphate in which the weight ratio of dibasic phosphate to monobasic phosphate is at least 5 about 4 to 1.

8. A process as claimed in claim 1 in which the surfactant is an anionic surfactant present in an amount of at least about 1 gram per liter of water forming the aqueous media.

9. A process as claimed in claim 7 in which the surfactant is an anionic surfactant present in an amount of at least about 1 gram per liter of water forming the aqueous media.

10. A process as claimed in claim 1 in which buffer is selected from the group consisting of sodium hydrogen phosphate, sodium dihydrogen phosphate, ammonium dihydrogen phosphate diammonium hydrogen phosphate and mixtures thereof.

11. A process as claimed in claim 5 in which the dibasic phosphate is selected from the group consisting of disodium hydrogen phosphate, diammonium hydrogen phosphate and mixtures thereof and in which the monobasis phosphate is from the group consisting of sodium dihydrogen phosphate, ammonium dihydrogen phosphate and mixtures thereof.

12. A process as claimed in claim 6 in which the dibasic phosphate is selected from the group consisting of disodium hydrogen phosphate, diammonium hydrogen phosphate and mixtures thereof and in which the monobasis phosphate is from the group consisting of sodium dihydrogen phosphate, ammonium dihydrogen phosphate and mixtures thereof.

13. A process for the production of inherently tacky, elastomeric microspheres which comprises suspending by agitation of an aqueous media in a reactor at least one polymerizable water insoluble monomer which is an alkyl acrylate ester containing from 4 to about 10 carbon atoms in the alkyl group, an initiator and an anionic surfactant and polymerizing the suspended monomer in the presence of a buffer which comprises a dibasic phosphate present in amount of at least about 7 grams per liter of water forming the aqueous media and in which the anionic surfactant is present in an amount of at least 1 gram per liter of water.

14. A process as claimed in claim 13 in which there is also present a monobasic phosphate.

15. A process as claimed in claim 14 in which the weight ratio of dibasic phosphate to monobasic phosphate is at least 4 to 1.

16. A process as claimed in claim 13 in which the dibasic phosphate is selected from the group consisting of disodium hydrogen phosphate, diammonium hydrogen phosphate and mixtures thereof.

17. A process as claimed in claim 14 in which the dibasic phosphate is selected from the group consisting of disodium hydrogen phosphate, diammonium hydrogen phosphate and mixtures thereof and in which the monobasic buffer is selected from the group consisting of sodium dihydrogen phosphate, ammonium dihydrogen phosphate and mixtures thereof.

18. A process as claimed in claim 16 in which the monobasic phosphate is selected from the group consisting of sodium dihydrogen phosphate, ammonium dihydrogen phosphate and mixtures thereof.

19. A process as claimed in claim 13 in which the alkyl acrylate ester is 2-ethylhexyl acrylate.

20. A process as claimed in claim 13 in which a carboxylic acid is present in amount of from 0 to 5% by weight of the monomers.

21. A process as claimed in claim 20 in which the carboxylic and is acrylic acid.

22. A process as claimed in claim 13 in which pH is maintained in the range of from about 7 to about 8.

* * * * *

UNITED STATES PATENT AND TRADEMARK OFFICE
CERTIFICATE OF CORRECTION

PATENT NO. : 5,656,705
DATED : August 12, 1997
INVENTOR(S) : Prakash Mallya

It is certified that error appears in the above-indentified patent and that said Letters Patent is hereby corrected as shown below:

Column 1, line 53, change "Convert" to -- convert --.
Column 6, line 64, change "62 grams" to -- .62 grams --

Column 10, line 32, after "least" delete "5".

Signed and Sealed this

Eleventh Day of August 1998

*Attest:*

BRUCE LEHMAN

*Attesting Officer*     *Commissioner of Patents and Trademarks*